A. ROSENTHAL.
SELF FEEDER.
APPLICATION FILED MAR. 31, 1911.
1,078,697.
Patented Nov. 18, 1913.
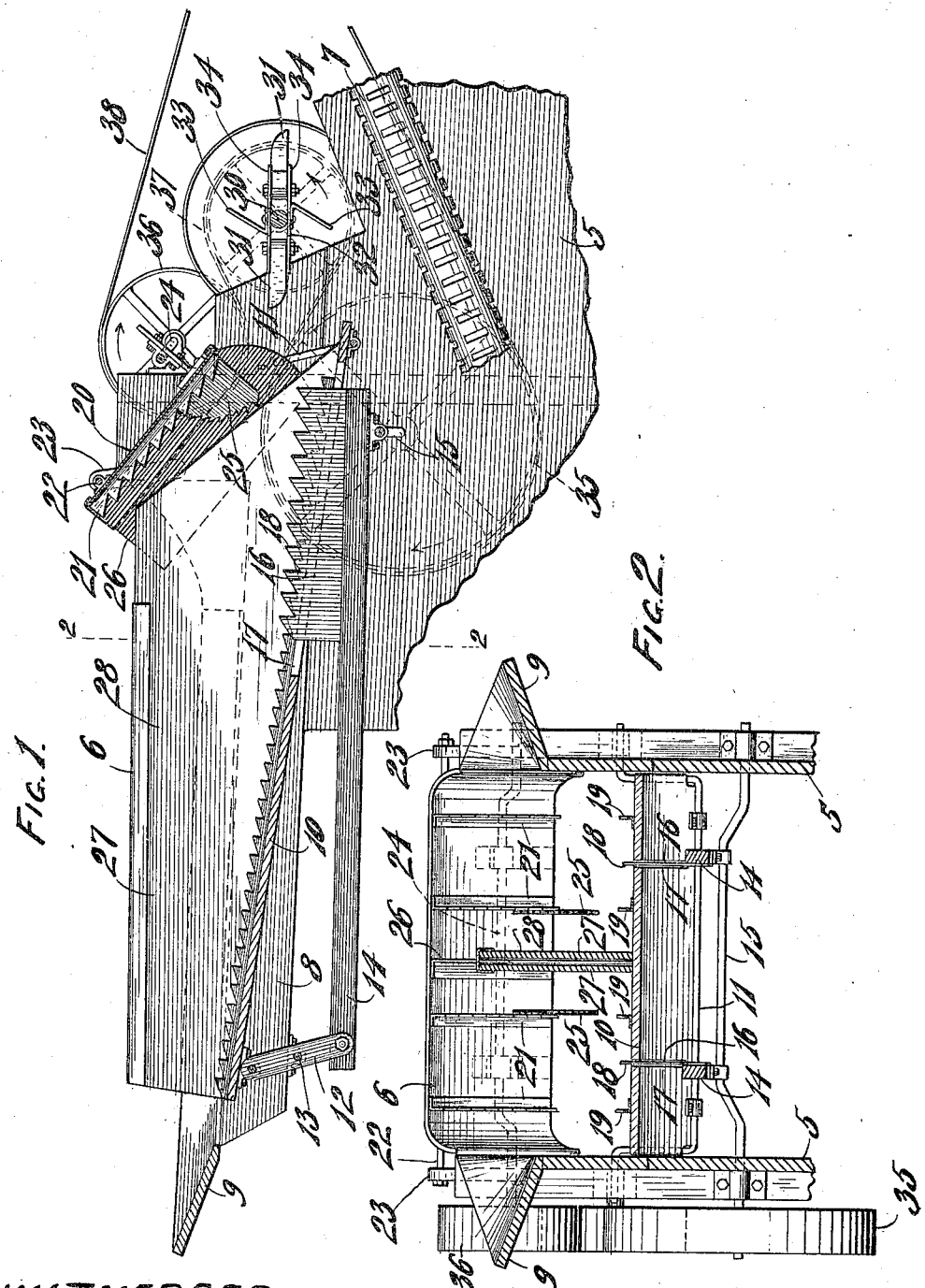
WITNESSES.
INVENTOR.
August Rosenthal
By Morsell & Caldwell
ATTORNEYS.

UNITED STATES PATENT OFFICE.

AUGUST ROSENTHAL, OF WEST ALLIS, WISCONSIN.

SELF-FEEDER.

1,078,697.   Specification of Letters Patent.   Patented Nov. 18, 1913.

Application filed March 31, 1911.   Serial No. 618,098.

*To all whom it may concern:*

Be it known that I, AUGUST ROSENTHAL, a citizen of the United States, residing in West Allis, in the county of Milwaukee and State of Wisconsin, have invented new and useful Improvements in Self-Feeders, of which the following is a description, reference being had to the accompanying drawings, which are a part of this specification.

This invention relates to improvements in self feeders and more particularly to that type used in connection with corn huskers, threshing machines and clover hullers.

It is one of the objects of this invention to provide a self feeder which is adapted to cut the bands and feed bundles of corn stalks to husking rolls of corn husking and shredding machines or to feed material to the reducing mechanism of any like machine such as threshing machines and clover hullers.

A further object of the invention is to provide a self feeder, with means for providing a steady even feed of material to the husking rolls and which will prevent the machine from becoming choked or inoperative when an excess amount of material is fed to the machine.

A further object of the invention is to provide a self feeder of the vibratory and oscillating type in which material is moved forwardly by a vibrating table operating in conjunction with an oscillating member and is then acted upon by a band cutter and material retarder and is further engaged by a beater if the material is not grasped by the husking rolls of the machine of which the feeder forms a part.

With the above, and other objects in view, the invention consists of the self feeder and its parts and combinations as set forth in the claims.

In the accompanying drawing in which the same reference characters indicate the same parts in the several views: Figure 1 is a central longitudinal sectional view of the improved self feeder shown in connection with a fragmentary portion of a corn husking and shredding machine; and Fig. 2 is a transverse sectional view thereof taken on line 2—2 of Fig. 1.

Referring to the drawing the numeral 5 indicates a fragment of a corn husking and shredding machine to which the improved feeder 6 is connected. The husking machine is provided with the usual husking rolls 7 (only one of which is shown) having the usual husking and snapping means formed thereon. The frame of the feeder consists of side members 8 having upper outwardly flaring portions 9 to guide the material on to the oscillating table or vibrating bottom portion 10 suspended between the side members 8. The inner end of the bottom portion is pivotally supported on the bail 11 depending from the frame 5 and the outer end is supported on the upper ends of the rock levers 12 (only one being shown) which are carried by the work shaft 13 extending transversely across the machine from one side member to the other. Connecting rods 14 connected to the lower ends of the rock levers 12 extend forwardly therefrom and at their inner ends are carried by the cranked portion of the crank shaft 15 journaled in the frame 5. These connecting rods are provided with upstanding plates 16 which extend through elongated slots 17 provided in the bottom portion 10 and have saw teeth or serrations 18 formed on their upper edges which extend forwardly in the direction of the feed. The bottom portion 10 is also provided with similar toothed plates 19 which, are positioned on opposite sides of and spaced a distance from the connecting rod plates. These bottom plates extend approximately the full length of the bottom portion and are adapted to move the material into the path of movement of the connecting rod plates which will move the material to the husking rolls or other reducing mechanism.

A kicker hood 20 provided with rearwardly extending toothed plates 21 is pivotally suspended from a rod 22 carried by upstanding arms 23 pivoted to the sides of the frame 8. The inner end of this hood is carried by the cranked portion of the crank shaft 24 which extends transversely across the machine and is journaled in bearings on the frame 8. The hood also carries band cutters 25 and a medial partition 26 which plays between the double walls 27 of the bottom portion medial partition 28. These partitions serve to divide the feed space into two parts and are only used in connection with a machine having four pairs of husking rolls. The hood is oscillated in a direction opposite to the feed of the material and its functions are to cut the bands and to kick back excess material and prevent clogging.

A shaft 30 positioned above the upper ends of the husking rolls and at a short distance from the hood is provided with beater knives 31 forming a beater 32 which is adapted to engage the material and pull it toward the husking rolls. The beater rotates in the opposite direction with relation to the direction of rotation of the hood shaft so that the material carried forward by the vibrating table and the oscillating bars and in part retarded by the hood will be engaged, separated and moved toward the husking rolls by the beater. The major part of the material will be grasped by the husking rolls and the part not grasped will be carried around with the beater and again presented to the rolls and finally engaged thereby. The beater is also provided with deflecting guards 33 in the form of angle plates which serve to prevent the material from winding closely around the holding plates 34 of the beater.

The shafts 15, 24 and 30 are provided with pulleys 35, 36 and 37 respectively and a belt 38 engaging said pulleys and extending to a source of motion serves to rotate said shafts and the parts connected thereto in the desired directions.

In the operation of the feeder, bundles of material are thrown on the vibrating bottom portion of the feeder and the bundles will be moved forwardly by the vibration of the bottom portion and the oscillation of the bar plates into engagement with the band cutters of the hood. The material will then pass beneath the hood to the husking rolls or other mechanism and be engaged thereby. If an excess amount of material is fed to the feeder the kicker hood will retard the excess amount and if all of the material passing beneath the hood is not immediately grasped by the husking rolls the beater knives will engage it and again present it to the rolls until engaged. If any of the bands should escape being cut by the band cutters they will be engaged and cut by the beater knives.

From the foregoing description it will be seen that the feeder is simple in construction and operation and is well adapted to perform the functions desired.

What I claim as my invention is:

1. A self feeder, comprising a two-part oscillating table for initially moving material, an oscillating member positioned above the oscillating table for engaging and retarding a portion of the material moved therebeneath, and another member positioned to engage the material passed between the oscillating table and the oscillating member and to further move said material.

2. A self feeder, comprising a two-part oscillating table for initially moving material, an oscillating hood positioned above the oscillating table for engaging and retarding a portion of the material moved therebeneath, said hood provided with material engaging teeth, and another member positioned to engage the material passed between the oscillating table and the hood and to further move said material.

3. A self feeder, comprising a frame having side members, a bail extending transversely across the frame, a rock shaft extending across the frame, a rock lever carried by the rock shaft, a slotted bottom portion pivotally supported on the bail at one end and on the rock lever at its other end, said bottom portion provided with toothed plates, a cranked shaft extending across the frame, a bar pivotally connected to the rock lever and to the cranked shaft for oscillating the bottom portion in a direction opposite to the oscillation of the bar, said bar provided with a toothed member which extends through the slot of the bottom portion, another cranked shaft extending across the frame, links pivotally connected to opposite sides of the frame, a hood pivotally connected to the links and to the last mentioned cranked shaft and provided with toothed portions and with a band cutter, and a beater positioned adjacent to the hood and adapted to further move the material moved by the bottom portion.

4. A self feeder, comprising a frame having side members spaced a distance apart, a bail extending transversely across the frame, a rock shaft extending transversely across the frame, rock levers carried by the rack shaft, a slotted bottom portion positioned between the side members and pivotally supported at one end on the loop of the bail and at its other end on the upper ends of the rock levers, said bottom portion provided with upstanding toothed plates positioned on opposite sides of the slots, a cranked shaft extending transversely across the frame, bars pivotally connected at one end to the lower ends of the rock levers and at their other ends to the cranked portion of the cranked shaft for oscillating the bottom portion in a direction opposite to the direction of oscillation of the bars, said bars provided with toothed plates which extend through the slots of the bottom portion, another cranked shaft extending transversely across the frame, links pivotally connected to the opposite sides of frame, and a hood pivotally connected to the links and to the last mentioned cranked shaft and provided with toothed portions and with a band cutter.

5. A self feeder, comprising a frame having an oscillating bottom material moving portion provided with an elongated slot, an oscillating member provided with a toothed member which extends through the elongated slot, said bottom portion and toothed member constructed to be oscillated in opposite directions with relation to each other, and an oscillating hood positioned above the bottom portion and provided with teeth adapted to engage and retard a portion of the material moved by the bottom portion and the oscillating member.

6. A self feeder, comprising a pair of oppositely movable oscillating members for moving material, one of said members being in the form of a slotted table and the other member extending through the slot in said table, and a member positioned above the oscillating members for engaging and retarding a portion of the material moved by the oscillating members, said retarding member being in the form of a hood provided with toothed plates.

In testimony whereof, I affix my signature, in presence of two witnesses.

AUGUST ROSENTHAL.

Witnesses:
C. H. KEENEY,
KATHERINE HOLT.

Copies of this patent may be obtained for five cents each, by addressing the "Commissioner of Patents, Washington, D. C."